(12) United States Patent
Laroche

(10) Patent No.: US 7,721,319 B2
(45) Date of Patent: May 18, 2010

(54) TELEVISION SIGNAL DISTRIBUTION SYSTEM AND METHOD USING IT

(75) Inventor: Vincent Laroche, Saint-Marcellin (FR)

(73) Assignee: Legrand France, Limoges (FR)

( * ) Notice: Subject to any disclaimer, the term of this patent is extended or adjusted under 35 U.S.C. 154(b) by 1723 days.

(21) Appl. No.: 10/835,612

(22) Filed: Apr. 30, 2004

(65) Prior Publication Data

US 2005/0081250 A1    Apr. 14, 2005

(30) Foreign Application Priority Data

Apr. 30, 2003    (FR) .................................. 03 05335

(51) Int. Cl.
*H04N 7/16* (2006.01)

(52) U.S. Cl. .................. 725/150; 725/144; 725/148; 725/149; 725/151

(58) Field of Classification Search ................ 725/144, 725/148–151
See application file for complete search history.

(56) References Cited

U.S. PATENT DOCUMENTS

| | | |
|---|---|---|
| 5,305,350 A | 4/1994 | Budin et al. |
| 6,567,988 B1 | 5/2003 | Okawa |
| 2003/0046706 A1 | 3/2003 | Rakib |

FOREIGN PATENT DOCUMENTS

| | | |
|---|---|---|
| WO | 97/01931 | 1/1997 |
| WO | 99/67880 | 12/1999 |
| WO | WO 03/028369 | 4/2003 |

*Primary Examiner*—Hunter B. Lonsberry
(74) *Attorney, Agent, or Firm*—Young & Thompson

(57) ABSTRACT

A system for distributing television signals comprises a first terminal which receives a coaxial cable, at least one second terminal which receives a twisted pair of conductors, and an amplifier system comprising a unit for selecting either a first slope or a second slope of increasing gain as a function of frequency between a signal present at the first terminal and a signal present at the second terminal. A method of distributing television signals includes a step of obtaining a system of the above kind, a step of determining a threshold for the length of the pair, and a step of selecting the first slope when the twisted pair has a length less than the threshold and the second slope when the twisted pair has a length greater than the threshold.

15 Claims, 3 Drawing Sheets

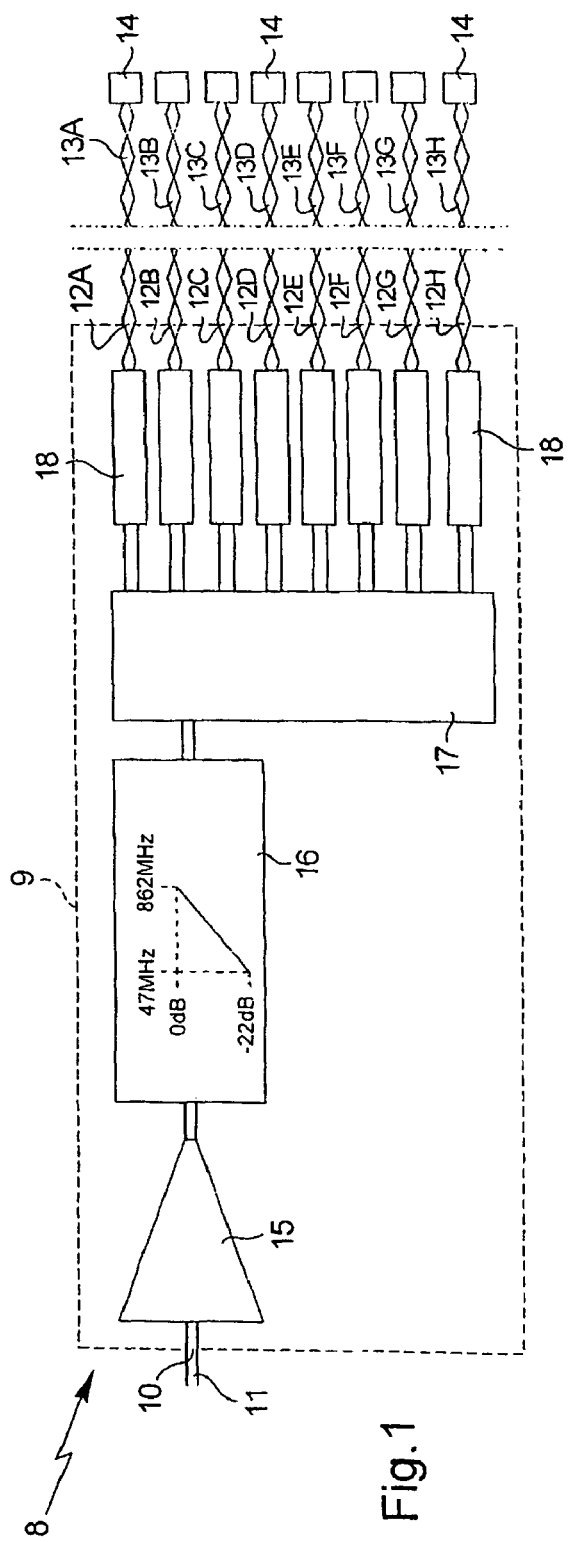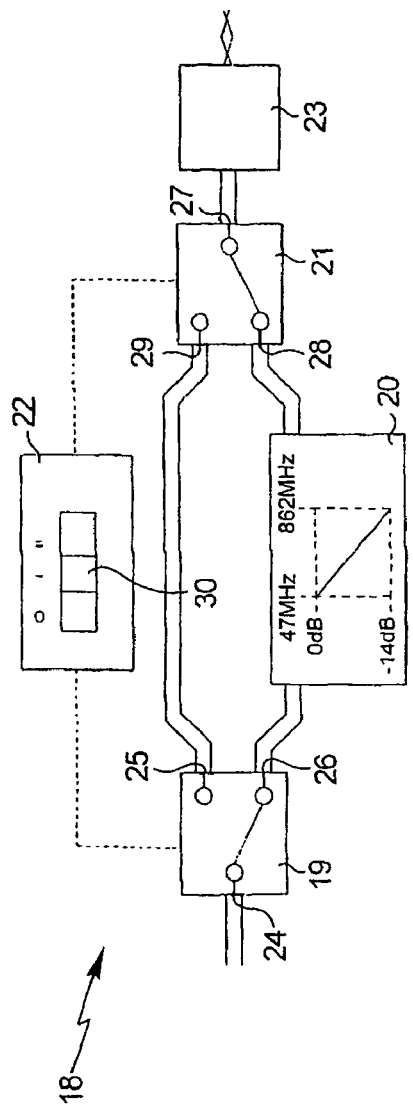
Fig.1
Fig.2

TELEVISION SIGNAL DISTRIBUTION SYSTEM AND METHOD USING IT

BACKGROUND OF THE INVENTION

1. Field of the Invention

The invention relates to the distribution of television signals.

2. Description of the Prior Art

Television signals are conventionally conveyed by coaxial cables, and thus in unbalanced form, but in certain circumstances it is beneficial to be able to distribute television signals over a twisted pair of conductors, i.e. in balanced form, especially if a twisted pair of conductors is available in a cable otherwise used to distribute telephone signals or local area network signals.

The invention aims to enable distribution using a twisted pair of conductors whose length may vary within a wide range.

SUMMARY OF THE INVENTION

To this end it proposes a system for distributing television signals, the system comprising a first connection terminal adapted to receive a television signal distribution coaxial cable, at least one second connection terminal adapted to receive a twisted pair of conductors, and an amplifier system comprising a unit for selecting either a first slope or a second slope of increasing gain as a function of frequency between a signal present at the first terminal and a signal present at the second terminal.

The facility to select either amplification slope provides optimum adjustment of the processing effected by the amplifier system to the length of the twisted pair of conductors and consequently enables television signals to be distributed over distances greater than the limits conventionally accepted at present, which are of the order of 30 meters.

According to features preferred for reasons of simplicity, convenience and economical implementation, said amplifier system comprises a linear amplifier having an input connected to the first terminal, a positive slope attenuator having an input connected to the output of the amplifier, and a signal shaper having an input connected to the output of the positive slope attenuator and an output connected to the second terminal, which shaper is adapted to insert selectively a negative slope attenuator between its input and its output.

Preferably, for the same reasons:

said shaper comprises:

a first switch having a first terminal, a second terminal and a third terminal and adapted to assume a first position in which it connects the first terminal to the third terminal and isolates the first terminal and the second terminal from each other and to assume a second position in which it connects the first terminal to the second terminal and isolates the first terminal and the third terminal from each other, which third terminal is connected to the positive slope attenuator;

a second switch having a first terminal, a second terminal and a third terminal and adapted to assume a first position in which it connects the first terminal to the second terminal and isolates the first terminal and the third terminal from each other and to assume a second position in which it connects the first terminal to the third terminal and isolates the first terminal and the second terminal from each other, which second terminal of the second switch is connected to the negative slope attenuator and which third terminal of the second switch is connected to the second terminal of the first switch; and a unit for controlling the first switch and the second switch adapted selectively to place each of the first and second switches in its first and second positions; and where applicable the unit is also adapted to place the first and second switches in one of the first and second positions and in the other of the first and second positions, respectively; and/or the configuration unit comprises a manual control button.

Preferably, for the same reasons:

the positive slope attenuator has a difference between its gain at 47 MHz and at 862 MHz that is from 21 to 23 dB; and where applicable the negative slope attenuator of the shaper has a difference between its gain at 47 MHz and at 862 MHz that is from 13 to 15 dB; and/or the gain of the linear amplifier is from 17.4 to 19.4 dB.

Preferably, for the same reasons, if the invention must be used to distribute television signals present on the coaxial cable to a plurality of twisted pairs of conductors:

the system according to the invention comprises a plurality of second connection terminals with the amplifier system which comprises one of the signal shapers for each of the second terminals; and where applicable the system according to the invention comprises a distributor having an input that is connected to the output of the positive slope attenuator and a plurality of outputs each of which is connected to a respective one of the signal shapers.

According to other features preferred for the same reasons:

the system comprises a plurality of second connection terminals with the amplifier system which comprises one of the selector units for each of the second terminals; and/or each shaper comprises a converter for converting unbalanced signals into balanced signals.

A second aspect of the invention provides a method of distributing television signals including a step of obtaining a system as described above, a step of determining a threshold for the length of the twisted pair of conductors, and a step of selecting the first slope when the twisted pair has a length less than the threshold and the second slope when the twisted pair has a length greater than the threshold.

Given the physical characteristics of conventional twisted pairs of conductors, the threshold is preferably from 27 to 29 meters.

The explanation of the invention continues now with the following description of one embodiment, provided by way of illustrative and nonlimiting example and with reference to the appended drawings.

BRIEF DESCRIPTION OF THE DRAWINGS

FIG. 1 is a block schematic of a television signal distribution installation comprising a system according to the invention.

FIG. 2 is a block schematic showing in detail one of the signal shapers of the above system, between a distributor and a terminal for connection to a twisted pair of conductors.

DETAILED DESCRIPTION OF THE PREFERRED EMBODIMENT

Figure 3:
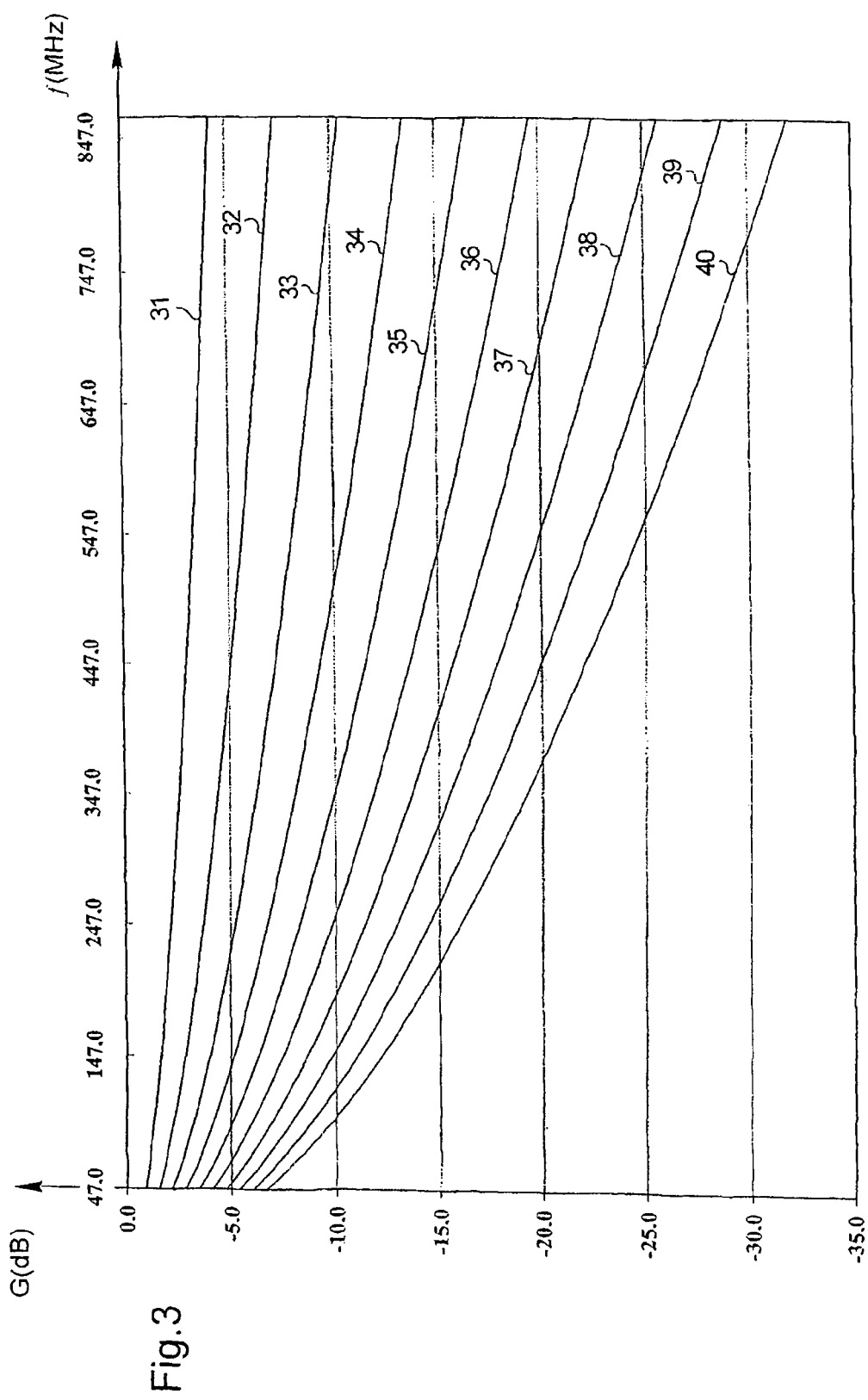
FIG. 3 is a graph depicting the attenuation of terrestrial television signals as they propagate in a twisted pair of conductors, in which graph the frequency in MHz is plotted on the abscissa axis and the gain in dB is plotted on the ordinate axis, the graph comprising a series of curves for different lengths of twisted pairs of conductors.

The installation 8 depicted diagrammatically in FIG. 1 comprises a system 9 having a connection terminal 10 at which terminates a coaxial cable 11 and eight connection terminals 12A to 12H at each of which terminates a respective one of eight twisted pairs of conductors 13A to 13H each of which is connected at the end remote from the system 9 to a jack 14.

The system 9 in this example is located in the plant room of a residential or tertiary building to which the installation 8 belongs.

The cable 11 is connected to a receive antenna or to a cable network for distributing terrestrial television signals.

In this example each of the twisted pairs of conductors 13A to 13H is part of a conventional local area network cable. Each of these cables comprises, in addition to one of the pairs 13A to 13H, three other twisted pairs of conductors carrying signals of a different kind, in this example local area network signals and telephone signals. These cables are routed in the building mentioned above between the system 9, which is part of a more comprehensive signal distribution system, and one of the jacks 14.

In this example each of the jacks 14 is an RJ 45 category 6 jack. Each of the pairs 13A to 13H is connected at the corresponding jack 14 to a pair of contacts conventionally denoted "7" and "8".

An adapter connected to the jack 14 and a coaxial cable connected between the adapter and the television set are used to connect a television set to one of the jacks 14. In a preferred embodiment, the coaxial cable and the adapter are combined in a common cord.

This adapter converts the balanced signal present on the twisted pair of conductors into an unbalanced signal that may be conveyed by a coaxial cable.

The system 9 comprises a linear amplifier 15, a positive slope attenuator 16, an 8-way distributor 17, and eight signal shapers 18.

The input of the amplifier 15 is connected to the terminal 10.

The output of the amplifier 15 is connected to the input of the attenuator 16.

The output of the attenuator 16 is connected to the input of the distributor 17.

Each of the eight outputs of the distributor 17 is connected to the input of one of the shapers 18.

The output of each shaper 18 is connected to one of the terminals 12A to 12H.

The television signal remains in the conventional unbalanced form between the cable 11 and the input of each of the shapers 18.

The shapers 18 are identical. One of them is described in more detail next with reference to FIG. 2.

The shaper 18 comprises a switch 19, a negative slope attenuator 20, a switch 21, a switch 22 controlling the switches 19 and 21, and a converter 23 for converting unbalanced signals into balanced signals.

The switch 19 has three terminals 24, 25 and 26. In the position depicted in FIG. 2, the switch 19 connects the terminals 24 and 26 and isolates the terminals 24 and 25 from each other. The switch 19 has another position in which it connects the terminals 24 and 25 and isolates the terminals 24 and 26 from each other.

The switch 21 has three terminals 27, 28 and 29.

In the position depicted in FIG. 2, the switch 21 connects the terminals 27 and 28 and isolates the terminals 27 and 29 from each other. In its other position, the switch 21 connects the terminals 27 and 29 and isolates the terminals 27 and 28 from each other.

The terminal 25 of the switch 19 and the terminal 29 of the switch 21 are connected together.

The terminal 26 is connected to the input of the attenuator 20.

The terminal 28 is connected to the output of the attenuator 20.

The terminal 27 is connected to the input of the converter 23.

The switch 22 comprises a cursor 30 with three positions 0, I and II.

In position I, the switches 19 and 21 are commanded so that each adopts the position depicted in FIG. 2.

In position II, the switches 19 and 21 are commanded so that each adopts the position other than that depicted in FIG. 2, i.e. so that the switch 19 connects the terminals 24 and 25 and isolates the terminals 24 an 26 from each other and the switch 21 connects the terminals 27 and 29 and isolates the terminals 27 and 28 from each other.

In position 0, the switches 19 and 21 are commanded so that one of them adopts the position other than that depicted in FIG. 2 and the other retains that position, for example so that the switch 19 connects the terminals 24 and 25 and isolates the terminals 24 and 26 from each other and the switch 21 retains the position depicted in FIG. 2.

When the cursor 30 of the switch 22 is in the position 0, there is no connection between the terminals 24 and 27, and more generally no connection between the terminal 10 and that of the terminals 12A to 12H to which the shaper 18 is connected.

In position I of the cursor 30, the shaper 18 is in the position depicted in FIG. 2, in which the signal present at the input of the unit 18 passes through the attenuator 20 and then the converter 23.

In position II, there is a direct connection between the terminals 24 and 27. The signal at the output of the shaper 18 is then that present at its input and converted by the converter 23.

The FIG. 3 graph depicts the attenuation of a terrestrial television signal as it propagates in one of the pairs 13A to 13H as a function of frequency.

The curves 31 to 40 correspond to lengths of 5, 10, 15, 20, 25, 30, 35, 40, 45 and 50 meters, respectively, of the twisted pair in question.

For a cable 5 meters long (curve 31) the attenuation is 0.9 dB at 47 MHz and 4.2 dB at 862 MHz and for a cable 50 meters long (curve 40) the attenuation is 6.7 dB at 47 MHz and 31.9 dB at 862 MHz.

The difference between the attenuation at 47 MHz and the attenuation at 862 MHz is therefore 3.3 dB for a length of 5 meters and 25.2 dB for a length of 50 meters.

To combat this relatively wide spread of the attenuation with the length of the twisted pairs, the system 9 may be configured so that the amplification between the cable 11 and each of the twisted pairs 13A to 13H may be effected with a gain increasing as a function of frequency, and selectively with one of two separate slopes, according to whether the length of the pair in question is less than or greater than a predetermined threshold.

In this example, when that of the pairs 13A to 13H concerned has a length less than 28 meters, the cursor 30 of the switch 22 is placed in position I, whereas if the length of this pair is greater than 28 meters, the cursor 30 is placed in position II.

In the former case (length greater than 28 meters) the linear amplifier 15 is followed by only the attenuator 16.

The gain of the system 9, which increases as the frequency increases, is therefore produced by the amplifier 15 and the attenuator 16 only.

In the example shown, the amplifier 15 is linear in the sense that it provides the same gain of 18.4 dB over the whole of the frequency band of terrestrial television signals (from 5 to 862 MHz) whereas, as shown very diagrammatically in FIG. 1, the slope of the attenuator 16 is such that it produces an attenuation of 22 dB at 47 MHz and no attenuation at 862 MHz.

The combination of the amplifier 15 and the attenuator 16 therefore provides a gain increasing regularly from −3.6 dB at 47 MHz to +18.4 dB at 862 MHz.

As shown highly diagrammatically in FIG. 2, the attenuation provided by the attenuator 20 is zero at 47 MHz and progressively increases to 14 dB at the frequency of 862 MHz.

The overall gain of the amplifier 15, the attenuator 16 and the attenuator 20, i.e. the overall gain of the system 9 between its input and one of the twisted pairs 13A to 13H, is therefore from −3.6 dB at 47 MHz to +4.4 dB at 862 MHz when the cursor 30 of the unit 18 is in position I.

In both cases, the overall gain increases with frequency, with a difference of 22 dB between its respective values at 47 MHz and at 862 MHz when the cursor 30 is in position II and with a difference of 8 dB between its values at 47 MHz and at 862 MHz when the cursor 30 is in position I.

Figure 4:
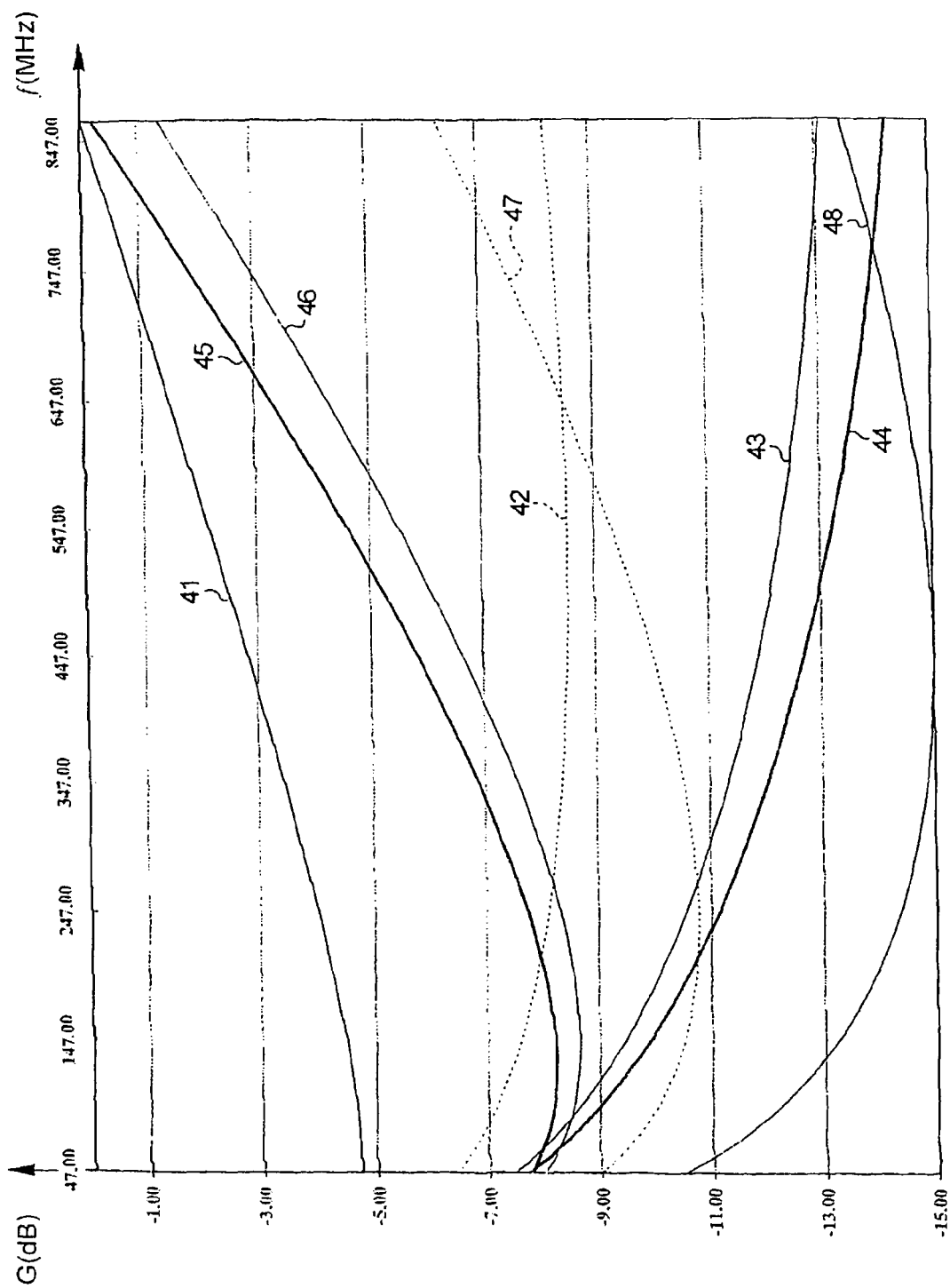
FIG. 4 is a similar graph for propagation throughout the whole of the installation depicted in FIG. 1, with the ordinate axis expanded compared to FIG. 3.

In the FIG. 4 graph, the curves 41 to 44 correspond to twisted pair lengths of 5 meters, 18 meters, 26 meters and 27.9 meters, respectively.

These lengths are all less than the threshold of 28 meters and the cursor 30 is therefore in position I.

The curves 45 to 48 correspond to lengths of 28.1 meters, 30 meters, 38 meters and 50 meters, respectively. Each of these lengths is greater than the threshold of 28 meters and the cursor 30 is therefore in position II.

The attenuation spread as a function of the length of the twisted pairs is particularly small and, for a given length, the maximum attenuation difference is 8 dB (curve 45), which conforms to the required dynamic range for television signals, in particular that of the standard EN 50083-7, which limits that dynamic range to 20 dB.

The various numerical values given hereinabove correspond to the example depicted and of course vary according to the conditions of use.

In this regard, at present, the preferred values used are as follows:

for the attenuator 16, a gain for which the difference between its value at 47 MHz and its value at 862 MHz is from 21 to 23 dB, for the attenuator 20, a gain for which the difference between its value at 47 MHz and its value at 862 MHz is from 13 to 15 dB, for the linear amplifier 15, a gain from 17.4 to 19.4 dB, and for the length of the twisted pairs, a threshold from 27 to 29 meters, to be more precise use of the low slope for lengths from 5 meters to this threshold and the high slope for lengths from the threshold to 50 meters.

It will further be noted that the value of 862 MHz mentioned hereinabove must not be considered as an upper limit beyond which the transmission of television signals is no longer possible; to the contrary, such transmission is possible, if required, for example at frequencies up to 900 to 950 MHz, or even higher.

It goes without saying that the shaper 18, although it constitutes a functional unit, does not necessarily constitute a single hardware unit, and likewise the system 9.

At present, in a preferred embodiment, the amplifier 15, the attenuator 16, the distributor 17 and the portion of each shaper 18 between the terminals 24 and 27 are combined in an active electronic unit while the converter 23 and the terminals 10 and 12A to 12H are part of a wiring concentrator provided with a connector adapted to receive that active electronic unit.

In an embodiment that is not shown, the switch 22 with the manual cursor 30 is replaced by an automated configuration device comprising means for measuring the length of the twisted pair, for example by its resistivity or by the reflection of a wave, and a switch controlled by said measuring means so that it automatically assumes position I or position II according to whether the result of measuring the length of the connection is below or above the threshold.

In another embodiment that is not shown, the amplifier 15 and the attenuator 16 common to each of the pairs 13A to 13H and the attenuator 20 specific to one of the pairs in question are replaced by individual amplifier systems of selectable slope, each disposed in one of the shapers 18.

In further embodiments that are not shown, each amplifier system specific to one of the twisted pairs has more than two slopes of the gain as a function of frequency between the signal present at the terminal 10 and the signal present at the terminal 12A to 12H in question, for example in order to be able to broadcast television signals over a twisted pair having a length greater than the threshold of 50 meters, and/or each twisted pair has television signal attenuation characteristics different from those depicted in FIG. 3, in particular improved performance corresponding to curves similar to the curves 31 to 40 but with the abscissa axis contracted, i.e. with the numerical values given in FIG. 3 replaced by higher numerical values.

In this regard, it will be noted that if the contraction of the abscissa axis is such that the value of 862 MHz is replaced by a value of the order of 2150 MHz, the embodiment of the installation 8 is suitable not only for distributing terrestrial television signals but also for distributing satellite television signals.

In further embodiments that are not shown, there are more than or fewer than eight twisted pairs, for example only one twisted pair, in which case there is no distributor 17.

Many other embodiments are feasible as a function of circumstances, and it must be remembered that the invention is not limited to the embodiments described and depicted.

There is claimed:

1. A system for distributing television signals, said system comprising a first connection terminal adapted to receive a television signal distribution coaxial cable, at least one second connection terminal adapted to receive a twisted pair of conductors, and an amplifier system comprising a unit for selecting either a first slope or a second slope of increasing gain as a function of frequency between a signal present at said first terminal and a signal present at said second terminal.

2. A system for distributing television signals, said system comprising:
   a first connection terminal adapted to receive a television signal distribution coaxial cable;
   at least one second connection terminal adapted to receive a twisted pair of conductors; and an amplifier system comprising a unit for selecting either a first slope or a second slope of increasing gain as a function of frequency between a signal present at said first terminal and a signal present at said second terminal, wherein said amplifier system comprises a linear amplifier having an input connected to said first terminal, a positive slope attenuator having an input connected to the output of said amplifier, and a signal shaper having an input connected to the output of said positive slope attenuator and an output connected to said second terminal, which shaper is adapted to insert selectively a negative slope attenuator between its input and its output.

3. The system claimed in claim 2 wherein said shaper comprises:

a first switch having a first terminal, a second terminal and a third terminal and adapted to assume a first position in which it connects said first terminal to said third terminal and isolates said first terminal and said second terminal from each other and to assume a second position in which it connects said first terminal to said second terminal and isolates said first terminal and said third terminal from each other, which third terminal is connected to said positive slope attenuator;

a second switch having a first terminal, a second terminal and a third terminal and adapted to assume a first position in which it connects said first terminal to said second terminal and isolates said first terminal and said third terminal from each other and to assume a second position in which it connects said first terminal to said third terminal and isolates said first terminal and said second terminal from each other, which second terminal of said second switch is connected to said negative slope attenuator and which third terminal of said second switch is connected to said second terminal of said first switch; and a unit for controlling said first switch and said second switch adapted selectively to place each of said first and second switches in its first and second positions.

4. The system claimed in claim 3 wherein said unit is also adapted to place said first and second switches in one of said first and second positions and in the other of said first and second positions, respectively.

5. The system claimed in claim 3 wherein said configuration unit comprises a manual control button.

6. The system claimed in claim 2 wherein said positive slope attenuator has a difference between its gain at 47 MHz and at 862 MHz that is from 21 to 23 dB.

7. The system claimed in claim 6 wherein said negative slope attenuator of said shaper has a difference between its gain at 47 MHz and at 862 MHz that is from 13 to 15 dB.

8. The system claimed in claim 6 wherein the gain of said linear amplifier is from 17.4 to 19.4 dB.

9. The system claimed in claim 2 comprising a plurality of second connection terminals with said amplifier system which comprises one of said signal shapers for each of said second terminals.

10. The system claimed in claim 9 comprising a distributor having an input that is connected to the output of said positive slope attenuator and a plurality of outputs each of which is connected to a respective one of said signal shapers.

11. The system claimed in claim 1 comprising a plurality of second connection terminals with said amplifier system which comprises one of said selector units for each of said second terminals.

12. The system claimed in claim 1 wherein each shaper comprises a converter for converting unbalanced signals into balanced signals.

13. A method of distributing television signals including a step of obtaining a system as claimed in claim 1, a step of determining a threshold for the length of said twisted pair of conductors, and a step of selecting said first slope when said twisted pair has a length less than said threshold and said second slope when said twisted pair has a length greater than said threshold.

14. The method claimed in claim 13 wherein said threshold is from 27 to 29 meters.

15. The method claimed in claim 13 wherein said selection step comprises selecting said first slope when said twisted pair has a length from 5 meters to said threshold and selecting said second slope when said twisted pair has a length from said threshold 50 meters.

* * * * *